(12) United States Patent
Light et al.

(10) Patent No.: US 7,165,889 B2
(45) Date of Patent: Jan. 23, 2007

(54) BEARING OIL LIFT POCKET

(75) Inventors: Kevin M. Light, Maitland, FL (US); Bern Luneburg, Mulheim an der Ruhr (DE); Christopher W. Ross, Oviedo, FL (US)

(73) Assignee: Siemens Power Generation, Inc., Orlando, FL (US)

( * ) Notice: Subject to any disclaimer, the term of this patent is extended or adjusted under 35 U.S.C. 154(b) by 112 days.

(21) Appl. No.: 11/044,792

(22) Filed: Jan. 27, 2005

(65) Prior Publication Data

US 2006/0165326 A1 Jul. 27, 2006

(51) Int. Cl.
*F16C 17/02* (2006.01)
(52) U.S. Cl. ........................................ 384/115; 384/292
(58) Field of Classification Search ................ 384/115, 384/292, 107, 111, 110
See application file for complete search history.

(56) References Cited

U.S. PATENT DOCUMENTS

| | | |
|---|---|---|
| 4,105,267 A | 8/1978 | Mori |
| 4,459,048 A | 7/1984 | Stachuletz |
| 4,671,676 A | 6/1987 | Chen et al. |
| 4,746,230 A | 5/1988 | Jensen |
| 5,007,745 A | 4/1991 | Ball et al. |
| 5,054,938 A | 10/1991 | Ide |
| 5,333,955 A | 8/1994 | Papa |
| 5,515,458 A | 5/1996 | Ide |
| 5,516,213 A | 5/1996 | Moriyama et al. |
| 5,518,321 A | 5/1996 | Hata |
| 5,558,444 A | 9/1996 | Ide |
| 5,660,481 A | 8/1997 | Ide |
| 5,702,186 A | 12/1997 | Hackstie et al. |
| 5,743,654 A | 4/1998 | Ide et al. |
| 5,772,335 A | 6/1998 | Miller |
| 5,951,172 A | 9/1999 | Byrne |
| 6,079,102 A | 6/2000 | Miller |
| 6,200,034 B1 | 3/2001 | Miller |
| 6,491,438 B1 | 12/2002 | Ono et al. |
| 6,499,883 B2 | 12/2002 | Miller |
| 6,739,756 B2 | 5/2004 | Miller |
| 2003/0190101 A1 | 10/2003 | Horng et al. |

*Primary Examiner*—Lenard A. Footland

(57) ABSTRACT

An oil lift pocket for a bearing surface having a plurality of channels in communication with a supply port. The plurality of channels may be formed in a substantially bow shaped configuration. Each channel may extend from a supply port and terminate at an end and away from the supply port. The oil lift pocket greatly reduces friction in slow turning operations and reduces babbitt delamination, dead zones, and nonuniform support and lift as well.

18 Claims, 1 Drawing Sheet

BEARING OIL LIFT POCKET

FIELD OF THE INVENTION

This invention is directed generally to bearings and, more particularly, to oil lift pockets in bearing assemblies.

BACKGROUND

Large scale shafts often use a tremendous breakaway torque to begin to rotate. The rotors coupled to the shafts overcome friction at breakaway and overcome friction while rotating. Oil pockets of various descriptions have been used on bearing surfaces, such as babbitts, to reduce friction associated with shafts in contact with the bearing surfaces with varying degrees of success. In applications where a shaft is turned at relatively slow speeds, such as less than about 400 revolutions per minute (rpm), oil lift pockets have been used to reduce friction. Friction is reduced by injecting oil under high pressure, such as greater than about 500 psi, to reduce the load of the shaft on the bearing surface and thereby reduce the friction of the shaft on the bearing surface. Conventional configurations of oil lift pockets have reduced friction found in such configurations. However, use of such oil lift pockets has resulted in delamination of the babbitt and dead zones in which dirt and other contaminants have accumulated. Thus, a need exists for an oil lift pocket having minimal impact on the babbitt and without dead zones.

SUMMARY OF THE INVENTION

This invention relates to an oil lift pocket for a bearing assembly for reducing friction between a shaft or other element and a bearing surface. Oil may be injected under a pressure of between about 1,800 pounds per square inch (psi) and about 2,200 psig and at a flow rate of between about one gallon per minute and about four gallons per minute into the oil lift pocket. Injection of the oil may reduce friction, thereby reducing breakaway torque between about 60 fold and about 200 fold. Reduction of friction using the oil lift pocket enables smaller, lower cost turning motors to be used without requiring that other components be changed. The reduced friction equates to reduced breakaway torque associated with initial rotation of a shaft. The reduced friction also enables higher projected pad pressures to be used than conventional systems, thereby enabling smaller, more efficient bearings to be used during slow speed operations.

The oil lift pocket may include a cylindrical bearing surface and a supply port extending through the cylindrical bearing surface. The oil pocket may also include a plurality of channels extending from the supply port. For instance, the oil lift pocket may include first, second, third, and fourth channels extending from the supply port forming a bowtie shaped oil lift pocket without the channels contacting each other at the tips of the channels. The first channel may extend from the supply port and have a bend between a first end of the first channel and a second end of the first channel, wherein the second end of the first channel is in communication with the supply port. The oil lift pocket may also include a second channel extending from the supply port and having a bend between a first end of the second channel and a second end of the second channel such that the first end of the second channel terminates proximate to the first end of the first channel, wherein the second end of the second channel is in communication with the supply port. The oil lift pocket may include a third channel extending from the supply port and having a bend between a first end of the third channel and a second end of the third channel, wherein the second end of the third channel is in communication with the supply port. Also, the oil lift pocket may include a fourth channel extending from the supply port and having a bend between a first end of the fourth channel and a second end of the fourth channel such that the first end of the fourth channel terminates proximate to the first end of the third channel, wherein the second end of the fourth channel is in communication with the supply port.

Each of the channels may be formed from a first section and a second section, which may be divided by the bends in each channel. The sections of the channels may extend from the supply port at an angle relative to a longitudinal axis. The size of the angles between the sections of the channels and the longitudinal axis may vary or be the same. In at least one embodiment, each of the angles is the same.

An advantage of the oil lift pocket of this invention is that the coefficient of friction may be reduced between about 60 fold and about 200 fold, and the breakaway torque may be reduced as well.

Another advantage of this invention is that the reduction of the coefficient of friction enables smaller, lower cost turning motors to be used.

Yet another advantage of this invention is that the oil lift pocket allows for higher projected pad pressures to be used, which enables smaller, more efficient bearings to be used.

Still another advantage of this invention is that the oil lift pocket eliminates dead zones for contaminant accumulation, babbitt delamination, and nonuniform support and lift.

These and other embodiments are described in more detail below.

BRIEF DESCRIPTION OF THE DRAWINGS

The accompanying drawings, which are incorporated in and form a part of the specification, illustrate embodiments of the presently disclosed invention and, together with the description, disclose the principles of the invention.

DETAILED DESCRIPTION OF THE INVENTION

Figure 1:
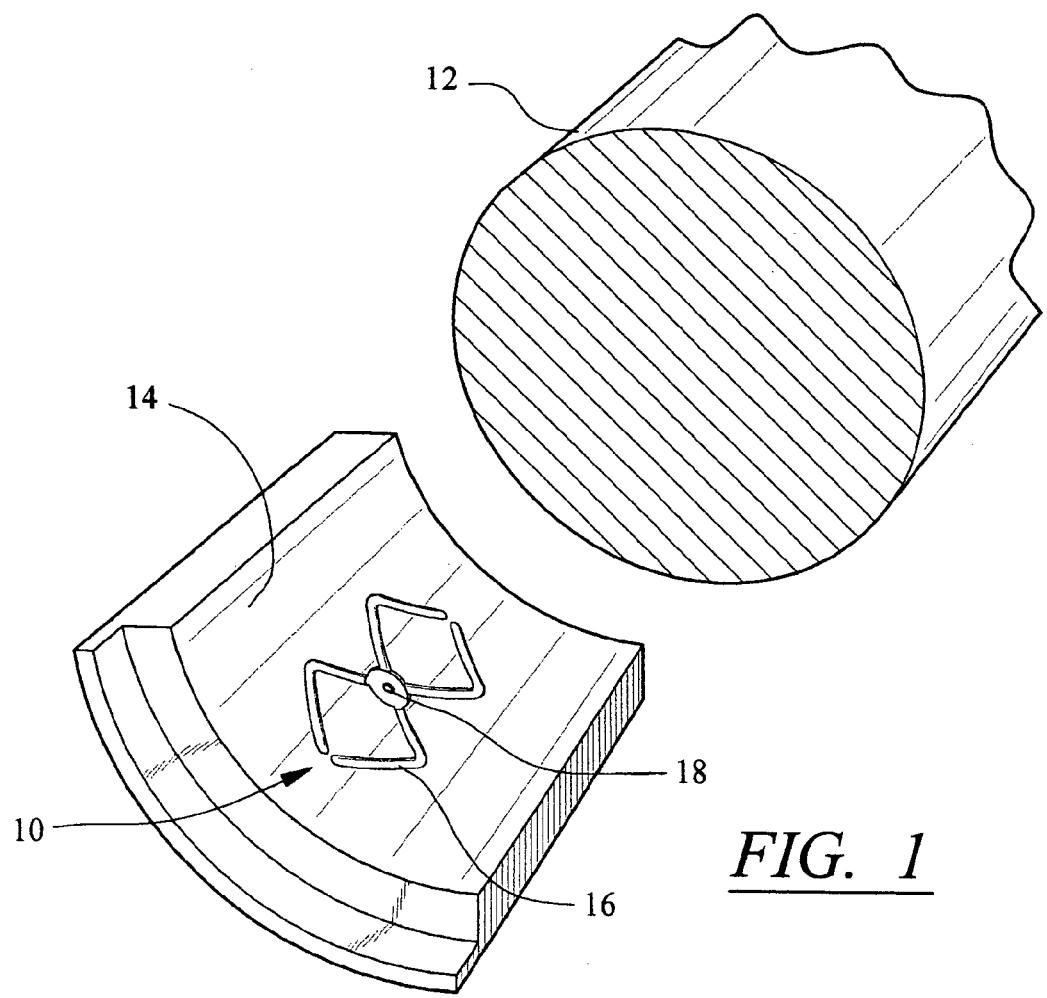
FIG. 1 is a perspective view of an oil lift pocket system of the instant invention installed in a turbine engine.
Figure 2:
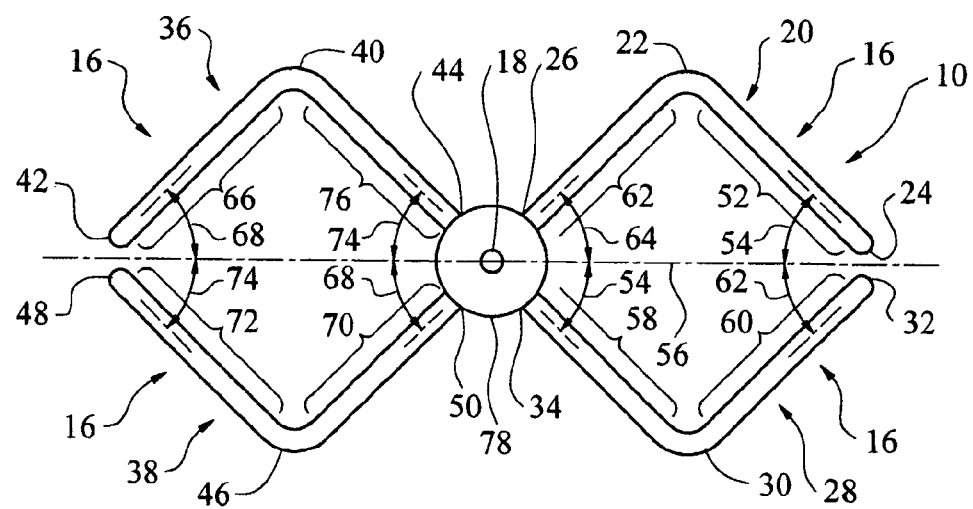
FIG. 2 is a frontal view of the oil lift pocket system shown in FIG. 1 on an inner surface of a rotor.

As shown in FIGS. 1–2, this invention is directed to an oil lift pocket 10 for reducing friction in relatively slow turning applications, such as when a shaft 12 is rotating at speeds less than about 400 revolutions per minute (rpm). The oil lift pocket 10 of this invention may be capable of reducing friction, as quantified by the coefficient of friction, between 60 and 200 fold. Such a large reduction in friction enables smaller sized turning motors to be used in the same application and smaller, more efficient bearings to be used, resulting in increased efficiency.

As shown in FIG. 1, the oil lift pocket 10 may be formed on a bearing surface 14. The bearing surface 14 may be, but is not limited to being, a babbitt or other appropriate structure, and may be formed from any appropriate material. The bearing surface 14 may include a plurality of oil channels 16 for containing pressurized oil for reducing friction on a shaft. More specifically, the bearing surface 14 may include channels 16 extending from a supply port 18 in a configuration that resembles a bowtie. However, in at least one embodiment, the channels 16 extend from the supply port 18 but do not contact each other. Instead, the channels 16 may form a bowtie shape in which the channel do not contact each other.

As shown in FIG. 2, a first channel 20 may extend from the supply port 18 and have a bend 22 between a first end 24 of the first channel 20 and a second end 26 of the first channel 20. The first channel 20 may be in fluid communication with the supply port 18. A second channel 28 may extend from the supply port 18 and have a bend 30 between a first end 32 of the second channel 28 and a second end 34 of the second channel 28. The second channel 28 may be in fluid communication with the supply port 18. The bend 30 may be configured such that the first end 32 of the second channel 28 terminates proximate to the first end 24 of the first channel 20 while the bend 30 of the second channel 28 and the bend 30 of the first channel 20 are remote from each other, as shown in FIG. 2. However, the bend 22 of the first channel 20 and the bend 30 of second channel 28 are positioned remote from each other, forming one side of the bow tie configuration of the oil lift pocket 10. The first and second channels 20, 28 may, in at least one embodiment, be mirror images of each other.

The oil lift pocket 10 may also include third and fourth channels 36, 38 extending from the supply port 18. In at least one embodiment, the channels 36, 38 may be in configuration that is a mirror image of the first and second channels 20, 28. For instance, the third channel 36 may extend from the supply port 18 and have a bend 40 between a first end 42 of the third channel 36 and a second end 44 of the first channel 20. The third channel 20 may be in fluid communication with the supply port 18 to receive oil from the supply port 18. The fourth channel 38 may extend from the supply port 18 and have a bend 46 between a first end 48 of the fourth channel 38 and a second end 50 of the fourth channel 38. The fourth channel 38 may be in fluid communication with the supply port 18. The bend 46 may be configured such that the first end 48 of the fourth channel 38 terminates proximate to the first end 42 of the third channel 36 while the bend 46 of the fourth channel 38 and the bend 40 of the third channel 36 are remote from each other, as shown in FIG. 2. However, the bend 40 of the third channel 36 and the bend 46 of second channel 38 are positioned remotely from each other, forming one side of the bow tie configuration of the oil lift pocket 10.

In at least one embodiment, the first and fourth channels 20, 38 may extend from the supply port 18 generally opposite from each other. In addition, the second and third channels 28, 36 may extend from the supply port 18 generally opposite from each other. In at least one embodiment, the first, second, third, and fourth channels 20, 28, 36, and 38 may extend from the supply port 18 at locations on the supply port that are generally equidistant from each other.

As shown in FIG. 1, the channels 16 may have portions of themselves that are positioned at angles relative to each other. For instance, the bend 22 in the first channel 20 may form a first section 52 proximate the first end 24 at a first angle 54 relative to a longitudinal axis 56, and the bend 30 in the second channel 28 may form a second section 58 proximate the second end 26 of the second channel 28 at the first angle 54 relative to the longitudinal axis 56. The bend 30 in the second channel 28 may form a first section 60 proximate the first end 32 at a second angle 62 relative to the longitudinal axis 56, and the bend 22 in the first channel 20 may form a second section 64 proximate the second end 26 of the first channel 20 at the second angle 62 relative to the longitudinal axis 56. The bend 40 in the third channel 36 may form a first section 66 proximate the first end 42 at a third angle 68 relative to the longitudinal axis 56 and the bend 46 in the fourth channel 38 may form a second section 70 proximate the second end 50 of the fourth channel 38 at the third angle 68 relative to the longitudinal axis 56. The bend 46 in the fourth channel 38 may form a first section 72 proximate the first end 48 at a fourth angle 74 relative to the longitudinal axis 56, and the bend 40 in the third channel 36 forms a second section 76 proximate the second end 50 of the first channel 20 at the fourth angle 74 relative to the longitudinal axis 56. The first, second, third, and fourth angles, 54, 62, 68, and 74 may be different values, or one or more of the angles 54, 62, 68, and 74 may have the same values. In at least one embodiment, the first, second, third, and fourth angles, 54, 62, 68, and 74 have the same values. The first, second, third, and fourth angles, 54, 62, 68, and 74 may be between about 45 degrees and 60 degrees. Bearings having a relatively short length may have angles 54, 62, 68, and 74 that are about 45 degrees, and bearings having a relatively long length may have angles 54, 62, 68, and 74 that are about 60 degrees.

The supply port 18 may have any appropriate configuration and be sized according to the anticipated flow rate of oil. In at least one embodiment, a counterbore 78 may be positioned concentrically with the supply port 18. The channels 20, 28, 36, and 38 may have varying depths depending on the application. In at least one embodiment, the channels 20, 28, 36, and 38 may have a depth of about 0.06 inches.

During operation, oil is injected into the oil lift pocket 10 to reduce friction on a shaft in contact with the bearing surface 14. In at least one embodiment, oil is injected into the supply port 18 where the oil flows into the channels 16. The oil may be injected under a pressure of between about 1,800 pounds per square inch (psi) and about 2,200 psig and at a flow rate of between about one gallon per minute and about four gallons per minute. Injection of the oil may reduce friction, thereby reducing breakaway torque by between about 60 and 200 fold. The configuration of the pocket does not contribute to the accumulation of contaminants.

The foregoing is provided for purposes of illustrating, explaining, and describing embodiments of this invention. Modifications and adaptations to these embodiments will be apparent to those skilled in the art and may be made without departing from the scope or spirit of this invention.

We claim:

1. An oil lift pocket for a bearing assembly, comprising:
a bearing surface;
a supply port extending through the bearing surface;
a first channel extending from the supply port and having a bend between a first end of the first channel and a second end of the first channel, wherein the second end of the first channel is in communication with the supply port;
a second channel extending from the supply port and having a bend between a first end of the second channel and a second end of the second channel such that the first end of the second channel terminates proximate to the first end of the first channel, wherein the second end of the second channel is in communication with the supply port;
a third channel extending from the supply port and having a bend between a first end of the third channel and a second end of the third channel, wherein the second end of the third channel is in communication with the supply port; and a fourth channel extending from the supply port and having a bend between a first end of the fourth channel and a second end of the fourth channel such that the first end of the fourth channel terminates proximate to the first end of the third channel, wherein the second end of the fourth channel is in communication with the supply port.

2. The oil lift pocket of claim 1, wherein the second channel extends from the supply port in a generally opposite direction from the third channel.

3. The oil lift pocket of claim 2, wherein the first channel extends from the supply port in a generally opposite direction from the fourth channel.

4. The oil lift pocket of claim 1, wherein the first channel, the second channel, the third channel, and the fourth channel extend from the supply port at locations on the supply port that are generally equidistant from each other.

5. The oil lift pocket of claim 1, wherein the bend in the first channel forms a first section proximate the first end at a first angle relative to a longitudinal axis and the bend in the second channel forms a second section proximate the second end of the second channel at the first angle relative to the longitudinal axis.

6. The oil lift pocket of claim 5, wherein the bend in the second channel forms a first section proximate the first end at a second angle relative to the longitudinal axis and the bend in the first channel forms a second section proximate the second end of the first channel at the second angle relative to the longitudinal axis.

7. The oil lift pocket of claim 6, wherein the bend in the third channel forms a first section proximate the first end at a third angle relative to the longitudinal axis and the bend in the fourth channel forms a second section proximate the second end of the fourth channel at the third angle relative to the longitudinal axis.

8. The oil lift pocket of claim 7, wherein the bend in the fourth channel forms a first section proximate the first end at a fourth angle relative to the longitudinal axis and the bend in the third channel forms a second section proximate the second end of the first channel at the fourth angle relative to the longitudinal axis.

9. The oil lift pocket of claim 8, wherein the first angle, the second angle, the third angle, and the fourth angle are substantially equal.

10. The oil lift pocket of claim 1, further comprising a counterbore at the supply port.

11. An oil lift pocket for a bearing assembly, comprising:
a cylindrical bearing surface;
a supply port extending through the cylindrical bearing surface for supplying oil to the oil lift pocket at between about 1,800 pounds per square inch and about 2,200 pounds per square inch at a flow rate of between about one gallon per minute and about four gallons per minute;
a first channel extending from the supply port and having a bend between a first end of the first channel and a second end of the first channel, wherein the second end of the first channel is in communication with the supply port;
a second channel extending from the supply port and having a bend between a first end of the second channel and a second end of the second channel such that the first end of the second channel terminates proximate to the first end of the first channel, wherein the second end of the second channel is in communication with the supply port;
a third channel extending from the supply port and having a bend between a first end of the third channel and a second end of the third channel, wherein the second end of the third channel is in communication with the supply port; and
a fourth channel extending from the supply port and having a bend between a first end of the fourth channel and a second end of the fourth channel such that the first end of the fourth channel terminates proximate to the first end of the third channel, wherein the second end of the fourth channel is in communication with the supply port.

12. The oil lift pocket of claim 11, wherein the first channel, the second channel, the third channel, and the fourth channel extend from the supply port at locations on the supply port that are generally equidistant from each other.

13. The oil lift pocket of claim 11, wherein the bend in the first channel forms a first section proximate the first end at a first angle relative to a longitudinal axis and the bend in the second channel forms a second section proximate the second end of the second channel at the first angle relative to the longitudinal axis.

14. The oil lift pocket of claim 13, wherein the bend in the second channel forms a first section proximate the first end at a second angle relative to the longitudinal axis and the bend in the first channel forms a second section proximate the second end of the first channel at the second angle relative to the longitudinal axis.

15. The oil lift pocket of claim 14, wherein the bend in the third channel forms a first section proximate the first end at a third angle relative to the longitudinal axis and the bend in the fourth channel forms a second section proximate the second end of the fourth channel at the third angle relative to the longitudinal axis.

16. The oil lift pocket of claim 15, wherein the bend in the fourth channel forms a first section proximate the first end at a fourth angle relative to the longitudinal axis and the bend in the third channel forms a second section proximate the second end of the first channel at the fourth angle relative to the longitudinal axis.

17. The oil lift pocket of claim 16, wherein the first angle, the second angle, the third angle, and the fourth angle are substantially equal.

18. The oil lift pocket of claim 11, further comprising a counterbore at the supply port.

* * * * *